(12) United States Patent
Sickel et al.

(10) Patent No.: US 11,701,691 B2
(45) Date of Patent: Jul. 18, 2023

(54) DEVICE AND METHOD FOR ROUNDING GRAPHITE FLAKES OF A GRAPHITE MATERIAL

(71) Applicant: NETZSCH Trockenmahltechnik GmbH, Hanau (DE)

(72) Inventors: Hermann Sickel, Müenzenberg (DE); Christian Höfels, Hanau (DE); Manuel Herzog, Sinntal (DE)

(73) Assignee: NETZSCH Trockenmahltechnik GmbH, Hanau (DE)

( * ) Notice: Subject to any disclaimer, the term of this patent is extended or adjusted under 35 U.S.C. 154(b) by 230 days.

(21) Appl. No.: 17/147,333

(22) Filed: Jan. 12, 2021

(65) Prior Publication Data

US 2021/0220875 A1 Jul. 22, 2021

(30) Foreign Application Priority Data

Jan. 16, 2020 (DE) ...................... 10 2020 100 907.0

(51) Int. Cl.
| | | |
|---|---|---|
| *B07B 7/083* | (2006.01) | |
| *B02C 13/14* | (2006.01) | |
| *B02C 13/286* | (2006.01) | |
| *B02C 15/10* | (2006.01) | |

(52) U.S. Cl.
CPC .............. *B07B 7/083* (2013.01); *B02C 13/14* (2013.01); *B02C 2013/28609* (2013.01)

(58) Field of Classification Search
CPC ....................................................... B07B 7/083
See application file for complete search history.

(56) References Cited

FOREIGN PATENT DOCUMENTS

| CN | 205550480 U | * | 9/2016 |
|---|---|---|---|
| CN | 209902915 U | * | 1/2020 |
| CN | 111571361 A | * | 8/2020 |
| CN | 112058409 A | * | 12/2020 |
| CN | 113731525 A | * | 12/2021 |
| CN | 114160268 A | * | 3/2022 |
| CN | 114534885 A | * | 5/2022 |
| DE | 112013005116 T5 | | 7/2015 |
| DE | 112016000490 T5 | | 11/2017 |

OTHER PUBLICATIONS

Gong et al., Comparisons of Ultrafine and Fine Particles in Their Associations with Biomarkers Reflecting Physiological Pathways, 2014, ACS Publications, Environmental Science & Technology 48 (9), https://pubs.acs.org/doi/10.1021/es5006016. (Year: 2014).*

(Continued)

*Primary Examiner* — Jacob S. Scott
*Assistant Examiner* — Miraj T. Patel
(74) *Attorney, Agent, or Firm* — Whitmyer IP Group LLC

(57) ABSTRACT

A device and a method for rounding a graphite material includes a feeding device for feeding the graphite material to the device; a plurality of rounding tools designed to revolve while rotating, which are arranged at the outer circumference of a disc rotating about a rotational axis and in a rotational direction; at least one guide apparatus; a separating device for separating fine material and superfine material; and a product outlet. Furthermore, provision is made such that a cover ring is arranged above the rounding tools.

20 Claims, 6 Drawing Sheets

(56) References Cited

OTHER PUBLICATIONS

Smith, The Three Types of Particulate Matter: All About PM10, PM2.5, and PM0.1, 2020, Kaiterra, https://learn.kaiterra.com/en/resources/three-types-of-particulate-matter. (Year: 2020).*

Nakazawa et al. Identifying, counting, and characterizing superfine activated-carbon particles remaining after coagulation, sedimentation, and sand filtration, 2018, National Library of Medicine (Year: 2018).*

* cited by examiner

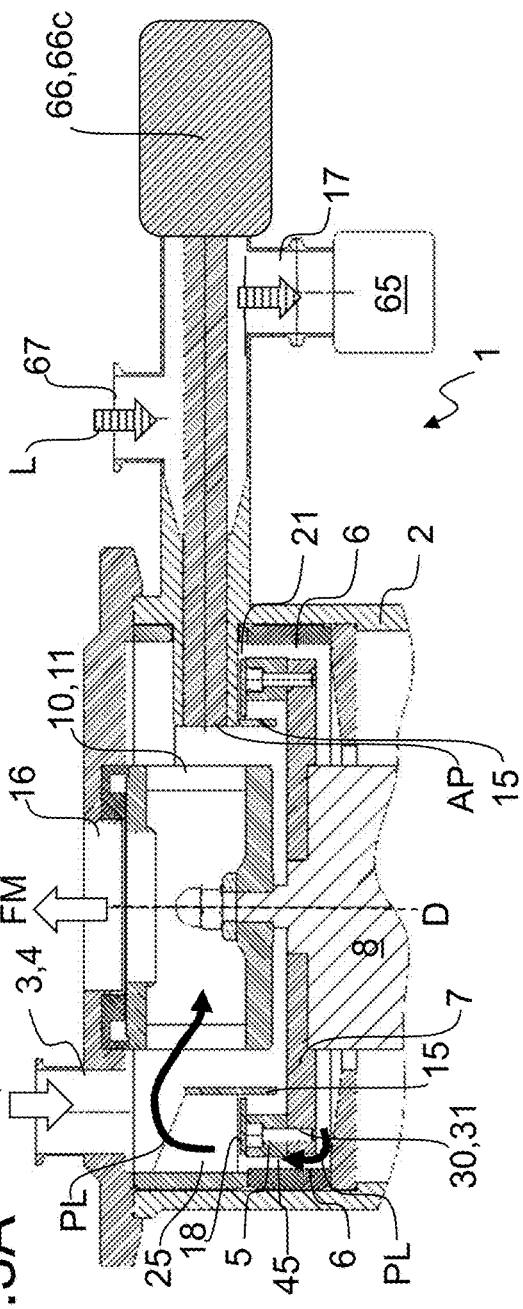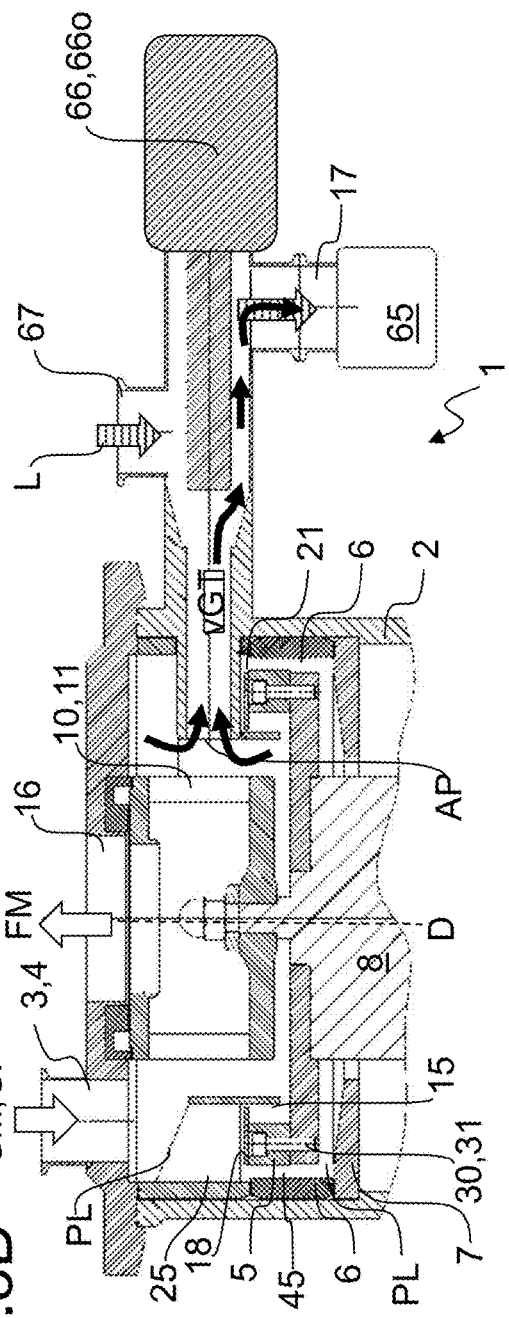

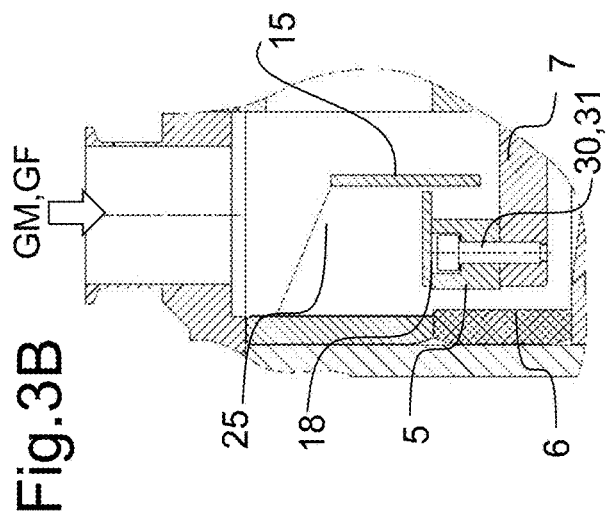
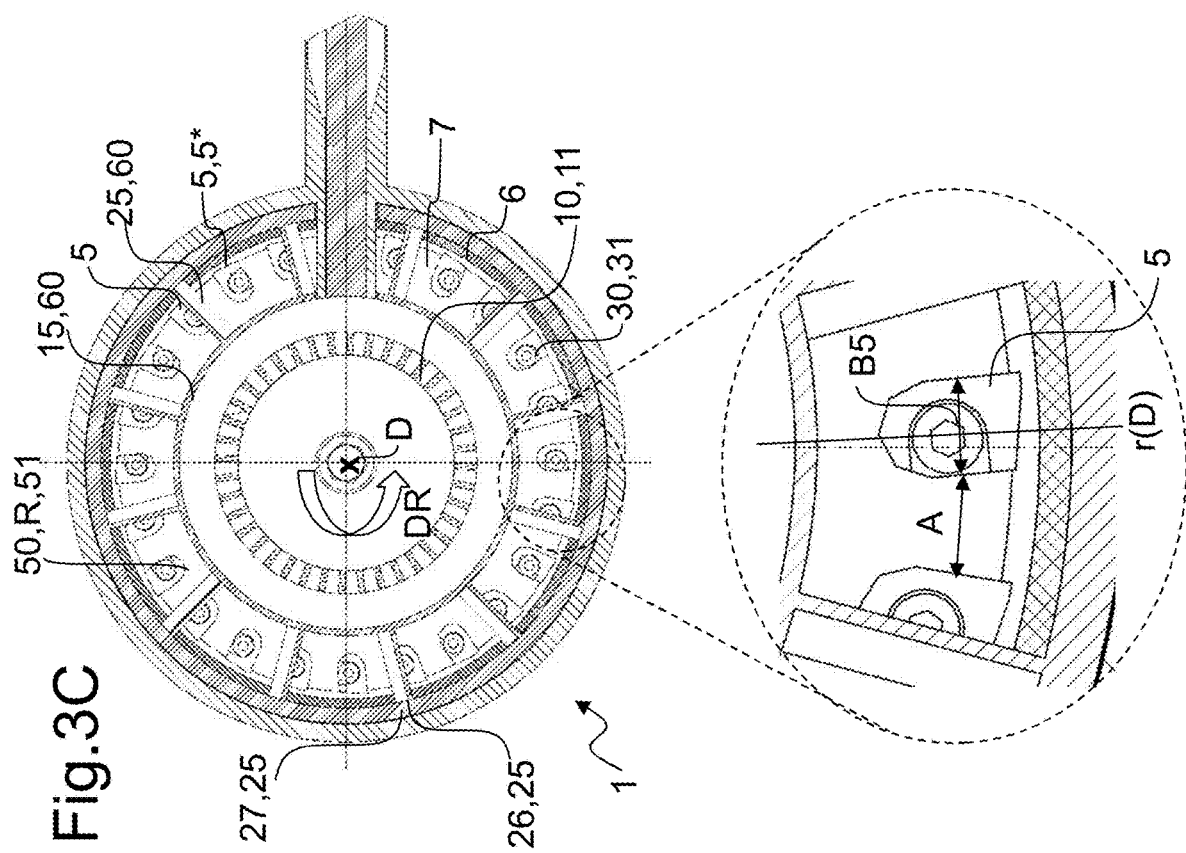

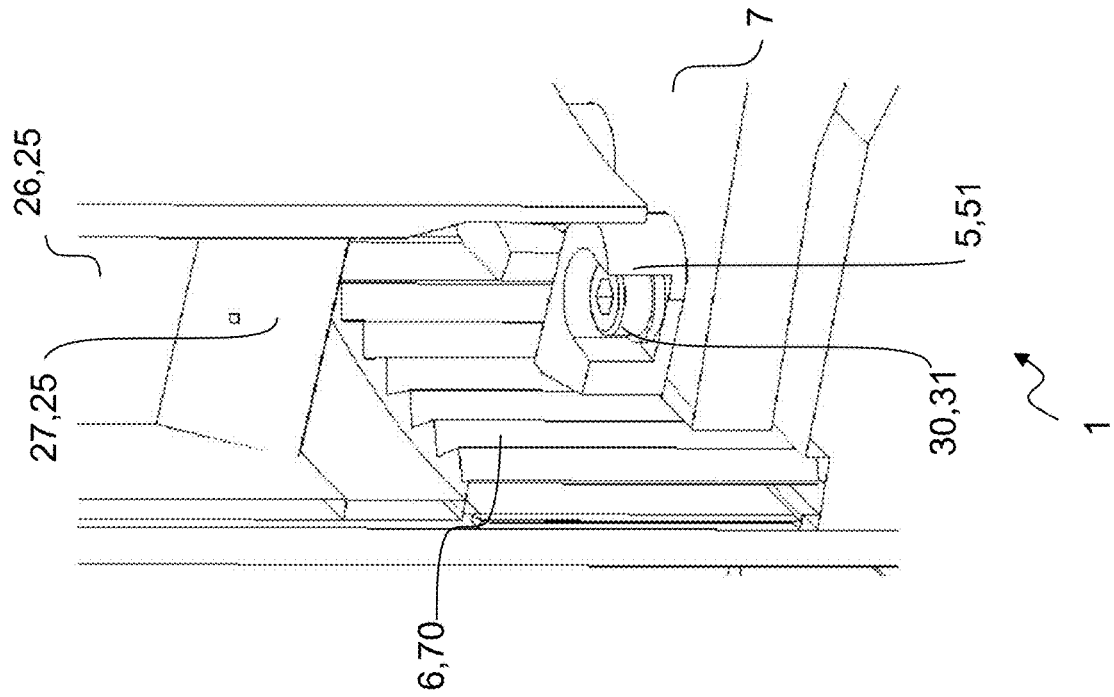
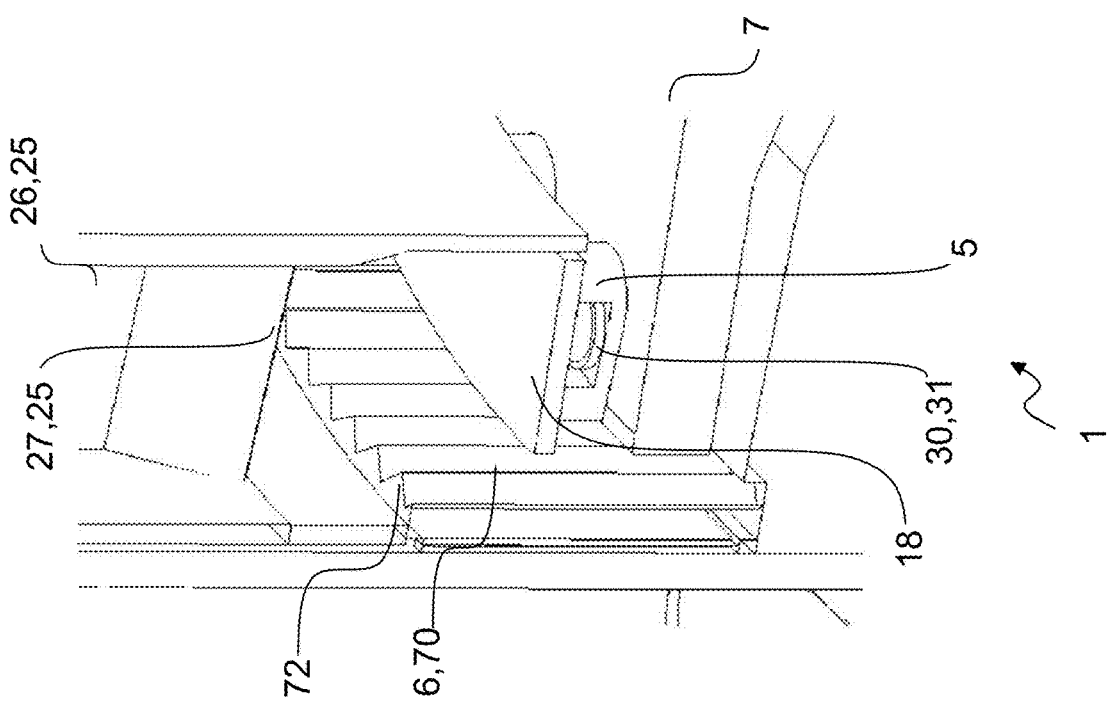

DEVICE AND METHOD FOR ROUNDING GRAPHITE FLAKES OF A GRAPHITE MATERIAL

TECHNICAL FIELD

The present invention relates to a device and a method for rounding graphite flakes of a graphite material according to the features of the independent claims.

BACKGROUND

The invention relates to a method for the production of a graphite powder, in particular for rounding flake graphite. Graphite is made of carbon and occurs naturally, but can be produced artificially. Artificial graphite is produced for example from brown or hard coal or oil by means of coking, wherein crystals arise. The crystals thus produced, however, are only uniform when the production process takes place in many steps. This is correspondingly expensive. Natural graphite occurs as amorphous graphite, flake graphite or vein graphite, in particular natural graphite forms grey to black hexagonal crystals which as a rule are arranged in layers stacked upon one another. Amorphous graphite resembles artificial graphite, i.e. the crystal size is small.

Graphite is distinguished by a high heat resistance and very good electrical and thermal conductivity. Graphite powder is used for example for the production of batteries, in particular as negative electrode material. Publication DE 11 2013 005 116 T5 describes a carbon-containing material for lithium-air battery cathodes, which exhibits a greater capacity than conventional carbon-containing materials.

Publication DE 11 2016 000 490 T5 describes a method for producing a graphite powder for a negative electrode material for a lithium ion secondary battery, which comprises a process in which a graphite precursor is pulverised, and a process in which the mixture of the pulverised graphite precursor and an alkaline compound is subjected to a graphitisation treatment by heating the mixture at 2800 to 3500° C.

For specific applications, rounded graphite flakes are required, in particular graphite powder is required which has graphite particles of a specific particle size and preferably a homogeneous rounded shape, in particular without corners and edges.

SUMMARY

The problem of the invention consists in providing a device and a method with which a graphite powder comprising rounded graphite particles, for example for use in the production of batteries, can be produced in a straightforward and cost-effective manner.

The above problem is solved by a device for rounding a graphite material, in particular graphite flakes, and a method for rounding a graphite material, which comprise the features in the independent claims. Further advantageous developments are described in the sub-claims.

The device comprises a feeding device for feeding the graphite material to be rounded, a plurality of rounding tools designed to revolve while rotating, at least one guide apparatus, which guides the graphite material to the rounding tools and/or a separating device, and a separating device for separating fine material and superfine material, which would disrupt subsequent processing steps. A plurality of rounding tools is arranged in a regular arrangement on a disc rotating about a rotational axis and in a rotational direction.

In particular, the rounding tools are fastened in a regular arrangement to the outer circumference of the rotating disc. Furthermore, the device comprises at least one product outlet, via which graphite material processed and in particular rounded inside the device can be removed from the device. Furthermore, provision is made such that a cover ring is arranged above the rounding tools.

The cover ring preferably extends over all the rounding tools arranged at the outer circumference of the disc. The cover ring leads to an improved internal flow guidance of a process air and thus also of the graphite material guided within the process air inside the device, in particular the cover ring enables an advantageous circulation of the graphite material inside the device. The cover ring prevents the coarse graphite material, in particular the graphite flakes and/or already rounded graphite particles, from being thrown upwards by a pressure wave formed at the rounding tools and being carried away by the process air above the rounding tools without making contact with the rounding tools. In particular, the cover ring forces a repeated active contact between the coarse graphite material and the rounding tools, in that it provides an upward limit to the movement space of the process air, which guides and/or conveys the graphite material, and increases the number of contacts between the graphite material and in each case at least one rounding tool. In particular, the cover ring prevents the graphite material from circulating through the device without active content with at least one rounding tool.

The graphite material conveyed in the process air flow experiences a swirling effect due to single or repeated active contact with at least one rounding tool of the device. By means of the at least one guide apparatus, the swirling graphite material is diverted into a largely vertical upward direction and for the most part is conveyed without swirling to the separating device. This brings about an optimum incoming flow on to the separating device, as a result of which a high separation selectivity of the separating device results.

The feeding device for the graphite material to be processed is arranged above the rotating disc with the rounding tools. The rotating disc is preferably arranged inside a cylindrical component, wherein the longitudinal axis of the cylindrical component and the rotational axis of the rotating disc coincide. The inner lateral surface of the cylindrical component represents at least in sections the so-called rebound surface for the graphite material. The graphite material introduced by the feeding device into the interior of the device is caught by the rounding tools, accelerated and guided towards the rebound surface. The rebound surface and the rounding tools are preferably designed such that the graphite material strikes the rounding tools at different angles and in particular repeatedly before it is conveyed to the rebound surface. A particularly favorable deformation of the graphite flakes can thus be achieved, in particular the desired folding of the graphite flakes is thus achieved.

When the graphite material strikes against the rounding tools, the corners of the graphite flakes are folded and wound around the core of the respective graphite flake. Smaller graphite particles agglomerate to form larger, in particular spherical particles. In addition, the initial internal porosity is minimized during the rounding. The graphite particles thus rounded have a smaller surface than the originally used graphite flakes. This brings about a smaller irreversible capacity and in addition a long service life. The smooth surface of the rounded graphite particles prevents flaking or exfoliation. The powder with the rounded graphite particles has a raised tamped density and therefore a high and in particular raised energy density. The powder with the rounded graphite particles is particularly well suited for the production of lithium ion batteries; since the lithium ions acquire a facilitated access to the graphite on account of the cavities formed between the rounded graphite particles, the lithium ions in particular accumulate in the planes between the folded graphite flakes. The powder with the rounded graphite particles is chemically cleaned again and coated after the rounding and before use for the production of batteries etc.

The separating device can for example be designed as an air separator with a separator wheel, in order to remove abrasive fines possibly arising during the rounding of the graphite flakes, in the form of fine material and/or superfine material during the ongoing rounding process. The separating device is arranged above the disc with the rounding tools. The rotational axis of the rotating disc with the rounding tools and the rotational axis of the separator wheel preferably coincide. In particular, the separator wheel is arranged coaxially above the rotating disc with the rounding tools. A feed nozzle for process air is formed in the lower region of the device. The process air is in particular fed upwards and conveyed to the rounding region, in particular the rounding tools, and is conveyed to the separating device by means of the guide apparatus. An internal circulation of process air is also present inside the device. By means of this circulation of the process air, the graphite material is repeatedly advanced towards the rounding tools. In addition, the fine material and/or superfine material is entrained by the process air and removed from the device via the separating device.

According to an embodiment, the rounding tools each comprise a lateral face pointing in the direction of the rotational axis, which is preferably formed convex in the direction of the rotational axis and/or which has a radius in the direction of the rotational axis or is formed by a plurality of rectangles. In particular, provision can be made such that the rounding tools each have a longitudinal axis, which coincides with a radial proceeding from the rotational axis of the disc. The lateral face of the rounding tool pointing towards the rotational axis of the disc has a radius or is formed as a rectangle. The lateral face is preferably subdivided by the radials in a mirror-symmetric manner. The formation of the lateral face pointing towards the rotational axis of the disc in a convex shape, as a radius or as a rectangle with a plurality of partial regions arranged at an angle to one another, leads to a mild strain on the graphite material. In particular, as a result of the selected shape of the rounding tools, the probability is increased of the graphite material striking at an advantageous 90 degree angle for the folding process. Each active contact between the graphite material and a rounding tool thus preferably brings about a folding process. The graphite material is thus folded in the desired manner and in particular not crushed, since a central impact between the surface of the rounding tools and the graphite material always occurs.

According to an embodiment, the distance between adjacent grinding tools amounts in each case to between 0.5 times a width of the grinding tools and five times the width of the grinding tools. The width of the rounding tools is determined orthogonal to the radial on which the respective rounding tool is arranged. Here, it concerns in particular a radial proceeding from the rotational axis of the disc on which the rounding tools are arranged. On the other hand, a length of the rounding tools is determined on the radial proceeding from the rotational axis of the disc. The distance preferably amounts to less than three times the width of the rounding tools, particularly preferably less than 1.5 times the width of the rounding tools.

The number of rounding tools preferably amounts to between 15 and 35 rounding tools per m of the circumference of the rotating disc on which the rounding tools are arranged.

According to an embodiment of the device, the guide apparatus comprises a plurality of guide elements, which are arranged in particular on at least one guide ring. Provision can be made here such that the number of the guide elements is smaller than the number of the rounding tools. Alternatively, the number of the guide elements can correspond to the number of the rounding tools or the number of the guide elements is greater than the number of the rounding tools. The graphite material fed by means of the feeding device strikes the guide ring and is thereby conveyed past the separator wheel, so that already present fine material and/or superfine material is separated out from the device in the ongoing process. The graphite material then strikes the rotating disc with the rounding tools which generate the energy for the rounding. The graphite material is caught, accelerated and thrown against the rebound surface, as a result of which the folding of the graphite material and accordingly the rounding is brought about.

The graphite material is preferably treated for a defined time in the device, wherein in particular it repeatedly comes into active contact with the rotating rounding tools and is accordingly deformed. In particular, the time is measured such that it can be assumed that after the lapse of the time the graphite material now consists for the most part only of rounded graphite particles, which can advantageously be used for the production of batteries. After completion of the rounding process, in particular after the lapse of a predefined processing time, the rounded graphite particles are removed from the device via a product outlet, for example the product is extracted from the device by suction. The extraction of the product by suction preferably takes place directly at the guide ring of the guide apparatus. It is thus ensured that only product is removed from the device that has previously been conveyed past the separator wheel, wherein the fine material and/or superfine material have been removed.

The guide apparatus comprising the guide elements and the guide ring is arranged above the rotating disc with the rounding tools. In particular, the guide apparatus is arranged static inside the device. According to an embodiment, the guide elements of the guide apparatus are designed as guide plates, which are arranged on the guide ring. The guide plates are each arranged and/or formed in sections in a plane perpendicular to the rotating disc and to a tangent of the rotating disc above the rounding tools. In particular, the guide plates extend essentially at right angles radially to the rotational axis of the rotating disc with the rounding tools. The lower region of the guide plates is preferably kinked towards the rotational direction of the rotating disc, so that an obtuse angle is formed between the kinked region and the vertical region of the guide plate. The kinked region brings about an optimized impact-free entry of the graphite particles into the vertical region of the guide apparatus comprising the guide elements. In particular, the kinked region of the guide elements supports the specified diversion of the swirling fine material and/or superfine material into a direction perpendicular to the rotating disc. The fed graphite material is first conveyed past the separator wheel by the air flow inside the device, strikes the rotating disc and is guided towards the rounding tools and the rebound surface.

According to an embodiment, a regulation of the supply of graphite material takes place by means of a control device of the device. For example, the control device controls the drive of the rotating disc with the rounding tools and/or the drive of the separating device and/or further machine components of the device, in particular the control device controls the respective speed of the rotating disc and/or the separating device. For example, the control device can regulate the feeding of the graphite material on the basis of a so-called switch-off value. When the running device is filled with graphite material, the current consumption of the drives increases. The control device contains information concerning at least one switch-off value, in particular information concerning current consumption values of the drives. When a defined switch-off value or both defined switch-off values are reached, the feeding of further graphite material is ended. For example, the feeding device comprises a valve, which is triggered by the control device when the switch-off value is reached and on the basis of the control signal is closed, so that no further graphite material can pass into the device.

In the course of the rounding process, the current consumption values can fall again, so that the measured values can provide information on the progress of the rounding process. According to an embodiment, provision can in particular be made such that, when the a second defined current consumption value is fallen below, which is also referred to as a second switch-off value, the metering and/or material feed can be started once again. The drives of rotating disc and/or separating device are not switched off during the entire process, as long as graphite material is still present in the device. Alternatively, provision can be made such that the device, after complete filling, i.e., after the first switch-off value has been reached, is operated for a defined time, which for example has previously been determined empirically and after which the rounding of all the graphite flakes is securely shut off. The control of the feeding of graphite material on the basis of the switch-off value ensures that the device is not overfilled and that the device is filled equally in a reproducible manner in particular in each production cycle.

The product outlet, via which the rounded graphite particles are removed from the device after completion of the rounding process, can for example comprise a suitable suction device for the product material. The suction position of the suction device is preferably constituted directly on an inner guide ring of the guide apparatus and the product outlet extends in particular radially to the inner guide ring. The suction unit generates an underpressure. For removal of the product, the suction unit is opened and the extracted air is carried away into a separating element, for example a cyclone with a filter. Here, the product comprising the rounded graphite particles is separated from the extracted air. In conjunction with this volume flow, the product is conveyed pneumatically out of the process chamber and the concentration of product in the process chamber of the device diminishes rapidly until complete emptying of the device. During the product removal process, the removal of fine material and/or superfine material via the separating device and the effect of the action on the graphite particles exerted by the rounding tools arranged on the rotating disc continue to be active.

The suction unit preferably has a suction position directly on the inner guide ring of the guide apparatus. The removal of the product by the suction unit in particular takes place radially to the inner guide ring. During the rounding of the graphite material, the suction unit is closed for example by a mobile cylinder extending radially to the inner guide ring. For the removal of the rounded graphite material, the suction unit is opened by displacement of the mobile cylinder and the product-air mixture comprising the rounded graphite particles is extracted into the suction unit.

In order to optimize the process conditions further, provision can be made such that the speed at which the rotating disc and therefore the rounding tools are moved can be varied in the ongoing operation. For example, provision can be made such that a new rotation speed is first selected, which is then increased to a maximum rotation speed in the ongoing operation. Alternatively, it may also be advantageous for certain processes first to start with a high speed and to reduce the latter in the ongoing operation. The device is preferably operated with a maximum speed of the rotating disc between 60 meters per second and 120 meters per second (related to the circumference of the disc).

With the device according to the invention and the method according to the invention, rounded graphite particles can be produced in a straightforward and cost-effective manner, said graphite particles being optimized for the production of batteries. In particular, the graphite flakes are rounded, in that the corners of the graphite flakes are folded and wound around the core of the graphite flakes. Smaller graphite particles can agglomerate to form larger spherical or sphere-like particles. In addition, the internal porosity of the graphite particles is minimized during the rounding, which is also advantageous for battery production.

The device according to the invention is distinguished in particular by a small machine size. In particular, no abrasive fines or only small amounts of abrasive fines in the form of fine material and/or superfine material, which are removed directly, arise inside the device. In particular, the abrasive fines are removed directly during the rounding process and before and also during the product removal from the device, so that particularly good yields of rounded, homogeneous graphite material, at least largely free from fine material, are achieved with the device and the method. In particular, a particularly homogeneous product largely free from abrasive fines is produced with the device and the method, which in particular has a tamped density of at least 800 grams per liter.

It is expressly mentioned at this point that all aspects and variants of embodiment, which have been explained in connection with the device according to the invention, can equally relate to or be partial aspects of the method according to the invention. Thus, when mention is made of specific aspects and/or relationships and/or effects at one point in the description or also in the definitions of the claims for the device according to the invention, this applies equally to the method according to the invention. The same applies conversely, so that all aspects or variants of embodiment, which have been explained in connection with the method according to the invention, can equally relate to or be partial aspects of the device according to the invention. Thus, when mention is made of specific aspects and/or relationships and/or effects at one point in the description or also in the definitions of the claims for the method according to the invention, this applies equally to the device according to the invention.

BRIEF DESCRIPTION OF THE FIGURES

In the following, examples of embodiment of the invention and its advantages are intended to be explained in greater detail with the aid of the appended figures. The size ratios of the individual elements with respect to one another in the figures do not always correspond to the actual size ratios, since some forms are represented simplified and other forms magnified in relation to other elements for the sake of a better illustration.

FIGS. 3A to 3D show different views of a further embodiment of a device according to the invention for rounding graphite flakes of a graphite material.

FIGS. 4A and 4B show different views in the interior of a further embodiment of a device according to the invention.

FIGS. 4A and 4B show different views for a partial region of the device.

DETAILED DESCRIPTION

Identical reference numbers are used for identical or identically operating elements of the invention. Furthermore, for the sake of a better overview, only reference numbers are represented in the individual figures which are required for the description of the respective figure. The represented embodiments merely represent examples as to how the device according to the invention and the method according to the invention can be designed and do not represent a conclusive limitation.

Figure 1:
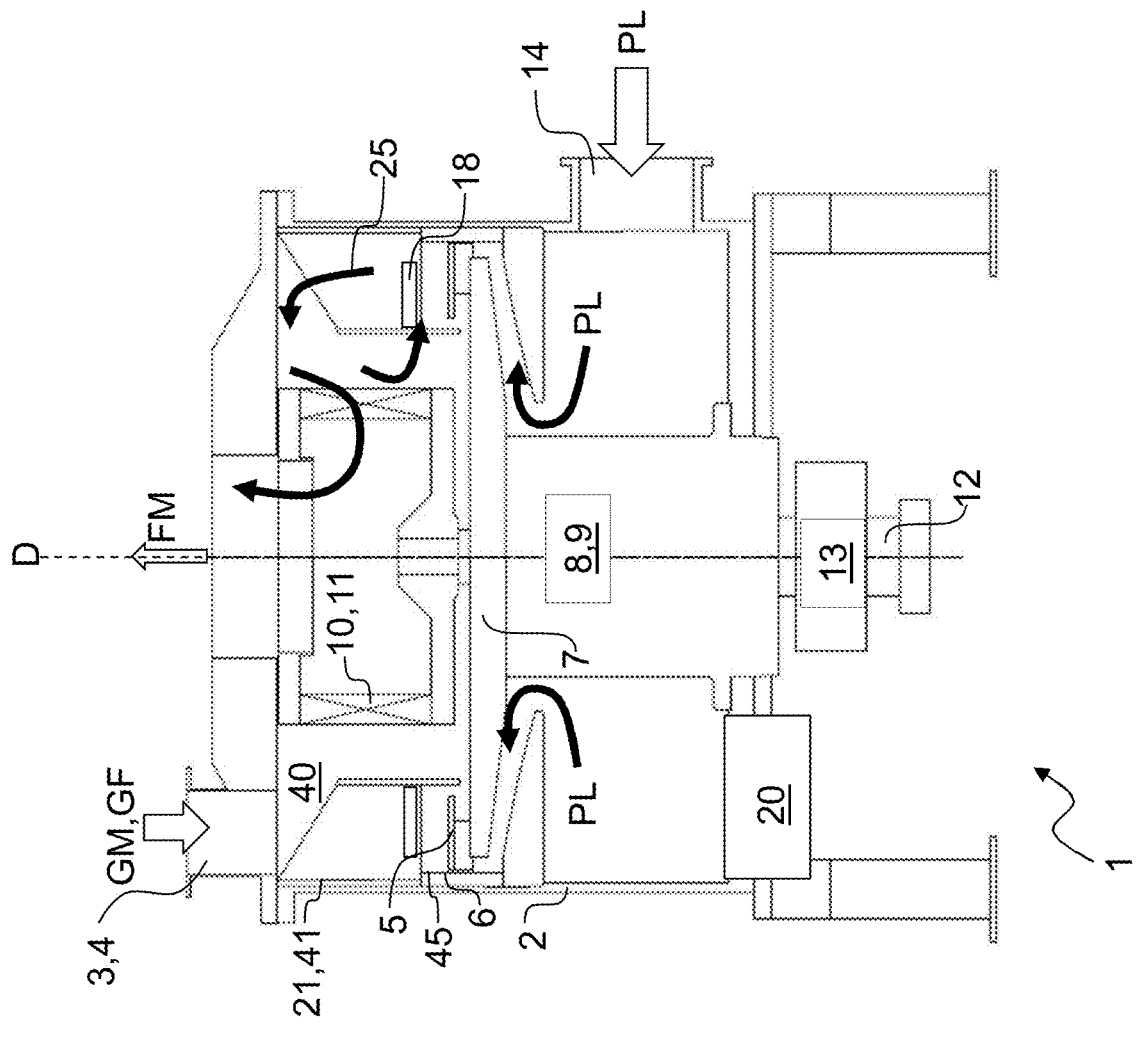
FIG. 1 shows a device according to the invention for rounding graphite flakes of a graphite material.

FIG. 1 shows a device 1 according to the invention for rounding graphite flakes GF of a graphite material GM. Device 1 comprises a housing 2 constituted approximately as an upright cylinder, at the upper side of which a feeding device 3 for feeding graphite material GM is arranged, in particular a feeding device 3 for feeding graphite flakes GF. In particular, in the example of embodiment shown, feeding device 3 is designed as a downpipe 4, but provision can also be made such that graphite material GM is fed by an injector feed.

Graphite material GM strikes rounding tools 5. The corners of graphite flakes GF are folded and wound around the core of the respective graphite flake GF. Smaller graphite particles agglomerate to form larger, in particular spherical particles. In addition, the initial internal porosity is minimized during the rounding. Graphite particles vGT thus rounded have a smaller surface than originally used graphite flakes GF. This brings about a smaller irreversible capacity and in addition a long service life. The smooth surface of rounded graphite particles vGT prevents flaking or exfoliation. The powder with rounded graphite particles vGT has an increased tamped density and therefore a high energy density. The powder is particularly well suited for the production of lithium ion batteries, since the lithium ions have a facilitated access to the graphite through the cavities formed between rounded graphite particles vGT, in particular the lithium ions accumulate in the planes between the folded graphite flakes. The powder with the rounded graphite particles is again chemically cleaned and then coated after the rounding and before use for battery production etc.

Device 1 preferably comprises a plurality of rounding tools 5 arranged on a rotationally mobile disc 7. Graphite material GM introduced into the interior of the device by feeding device 3 is caught by rounding tools 5, accelerated and conveyed against a rebound surface 6. Rebound surface 6 in particular represents a region of cylindrically formed inner lateral surface 21 of housing 2.

Rounding tools 5 are arranged in particular around the entire circumference and at regular intervals from one another at the outer circumference of a rotationally mobile disc 7, which is arranged by way of a first drive shaft 8 on a first drive 9. Rebound surface 6 and rounding tools 5 are designed such that graphite material GM strikes rounding tools 5 at different angles, as a result of which a particularly advantageous deformation, in particular folding, of graphite flakes GF can be achieved. Rounding tools 5 are optimized in particular for the greatest possible number of particle impacts at different impact angles.

Device 1 also comprises a separating device 10, for example an air separator with a separator wheel 11. During the rounding of graphite flakes GF, abrasion in the form of fine material and/or superfine material FM may occur. Since desired end product EP should preferably comprise only rounded graphite particles vGT, fine material and/or superfine material FM is directly separated inside device 1 from rounded graphite particles vGT and removed from device 1. Separating device 10 is arranged above disc 7 with rounding tools 5. Separator wheel 11 is connected by a second drive shaft 12 to a second drive 13. Provision is in particular made such that first drive shaft 8 and second drive shaft 12 are arranged coaxially.

Process air PL is fed from the bottom upwards via feed nozzle 14 in the lower region of device 1, in particular below rotating disc 7 with rounding tools 5, said process air being guided towards the rounding region and via guide elements 25 to separating device 10. Process air PL entrains fine material and/or superfine material FM and discharges the latter via suction nozzles 16 out of device 1.

Inside device 1, graphite material GM comes at least once into active contact with at least one rounding tool 5, as a result of which graphite material GM experiences a swirling effect. By means of guide elements 25, swirling graphite flakes GF, swirling rounded graphite particles vGT and swirling fine material and/or superfine material FM are diverted into a vertical direction, in particular perpendicular to rotating disc 7, and thus reach separating device 10 for the most part without a swirling effect. This brings about an optimum incoming flow onto separating device 10, as a result of which a high separation selectivity results.

According to an embodiment of the invention, graphite material GM is fed by means of feeding device 3 to process chamber 40 of device 1. Graphite material GM strikes guide ring 41 and GM is conveyed past separator wheel 11, so that already present fine dust is separated out. Graphite material GM then strikes plate 7 with rounding tools 5, which provide the energy for the rounding. In particular, graphite material GM is caught by disc 7 with rounding tools 5, accelerated and thrown against rebound surface 6. Product outlet 17 is closed during these first two process steps, as will be described below in greater detail in connection with FIGS. 3A and 3D.

Process air and/or process air PL passes via feed nozzle 14 into housing 2 of device 1 and flows through a gap 45 formed between disc 7 with rounding tools 5 and rebound surface 6. When they flow through gap 45, the graphite particles acted upon by the air volume flow are supplied through guide ring 41 in a targeted manner to separator wheel 11. The material, which now comprises at least partially rounded graphite particles, passes in an internal flow back to disc 7 with rounding tools 5, the fine dust, in particular fine material and/or superfine material FM, leaves device 1 with process air and/or process air PL via suction nozzle 16.

Rounded graphite particles vGT (see FIGS. 2D and 2E) are drawn off by a suction device similar to an injector feed through product outlet 17. The suction takes place directly at the inside of a ring 41. It is thus ensured that no graphite material GM is drawn off from device 1 which has not previously been conveyed past separator wheel 11.

Graphite material GM is treated for a defined time in the device, wherein in particularly it comes repeatedly into active contact with rotating rounding tools 5, as a result of which graphite flakes GF are folded and reshaped into rounded graphite particles vGT. After a predefined time, it can be assumed that graphite material GM for the most part now consists only of rounded graphite particles vGT. The end product in the form of rounded graphite particles vGT can now be removed out of device 1 via product outlet 17 and for example used for the production of batteries.

For the further improvement of the strain on graphite material GM by means of an improved flow control, provision can be made such that a cover ring 18 is arranged in each case above rounding tools 5. Cover ring 18 advantageously extends over all rounding tools 5 arranged at the circumference of rotating disc 7 and enables an advantageous circulation of the graphite particles to be rounded, since the flow control of the graphite particles inside device 1 is optimised by cover ring 18. This cover ring 18 in particular prevents coarse graphite material GM, in particular graphite flakes GF and/or already rounded graphite particles vGT, from being thrown upwards and from circulating through device 10 without contact with rounding tools 5. Cover ring 18 in particular forces a repeated active contact between rounding tools 5 and coarse graphite material GM.

According to an embodiment, device 1 further comprises a control device 20, by means of which first drive 9 and/or second drive 13 and therefore the speed of separator wheel 11 and/or the speed of disc 7 with rounding tools 5 can be regulated and/or can be adjusted according to the product requirements.

Furthermore, provision can be made such that the feeding of graphite material GM is regulated due to the so-called switch-off value. In particular, this switch-off value is generated by device 1 itself. During the filling of running device 1 with graphite material GM, the current consumption of drives 9, 13 increases. Control device 20 contains information concerning at least one switch-off value, in particular information concerning current consumption values of drives 9, 13. When a defined switch-off value or both defined switch-off values are reached, the feeding of further graphite material GM is ended. For example, feeding device 3 (see also description in respect of FIGS. 3A to 3C) comprises a valve, which is triggered by control device 20 when the switch-off value is reached and is closed due to a control signal, so that no further graphite material GM passes into device 1.

In the course of the rounding process, the current consumption values can again fall, so that this can be information concerning the progress of the rounding process. Provision can in particular be made according to an embodiment such that, when a second defined current consumption value is fallen below, which is also referred to as the second switch-off value, the metering and/or material feed can be started once again. Drives 9, 13 are not switched off as long as graphite material GM is present in device 1.

Alternatively, provision can be made such that, after the complete filling, i.e., after the first switch-off value is reached, device 1 is operated for a defined time, which for example has previously been determined empirically and after which the rounding of all graphite flakes GF is securely terminated.

The control of the feeding of graphite material GM by means of the switch-off value ensures that device 1 is not overfilled and is filled equally in a reproducible manner in particular in each production cycle.

The rounding of graphite material GM with device 1 described here and according to the method described here can be split up into three steps, in particular filling, rounding and removal. These three steps cannot be clearly separated from one another, but are described individually in the following.

During the filling, graphite material GM is introduced for example through an injector into process chamber 40. An air flow of process air PL with a circulation applied by rotating disc 7 also flows through process chamber 40. Rounding tools 5 on rotating disc 7 accelerate the graphite particles together with process air PL in the direction of inner lateral surface 21 of housing 2 and the graphite particles follow the air flow to separator wheel 11. The graphite particles then again pass through the cycle defined by the air flow. The current consumption of second drive 13 of separator wheel 11 increases depending on the product loading. Device 1 can thus be filled up to a selected level and a direct process value is received which can be used as a switching point. During the filling, the metering can employ "top-up metering" in order to compensate for initial weight and/or concentration reductions. When the desired state is however reached, the filling ends and the second step of the rounding begins.

In reality, the second step of the rounding begins as soon as first graphite material GM passes into device 1. Because as soon as the first graphite particles are conveyed in the air flow of process air PL, the rounding also starts. However, we regard as a uniform starting point the aforementioned switching point of the separator flow which is generated inside device 1. As soon as the desired filling level in device 1 is reached, the metering is not put into operation again until after the third step of removal, even if the predefined switching point is fallen below at a later time. This is necessary to guarantee a uniform rounding time for all the graphite particles. A variation of the process parameters over the course of the rounding time may in many areas be advisable.

The third step of removal takes place in particular using a suction unit. The suction unit generates an underpressure and is connected to device 1 by a suction nozzle which is closed by a flap. At the start of the third removal step or product removal step, the suction unit is opened and the extracted air is conveyed into a separating element. An embodiment of such a suction unit 65 is described below in connection with FIGS. 3A and 3D. A cyclone with a filter, for example, is suitable as a separating element. Here, the product comprising the rounded graphite particles is separated from the gas. In conjunction with this volume flow, the product is conveyed pneumatically out of process chamber 40 and the concentration diminishes rapidly until complete emptying is reached. During the process, the removal of fine material and/or superfine material FM and the effect of the action on the particles exerted by rounding tools 5 arranged on rotating disc 7 continue to remain active.

Figure 2B:
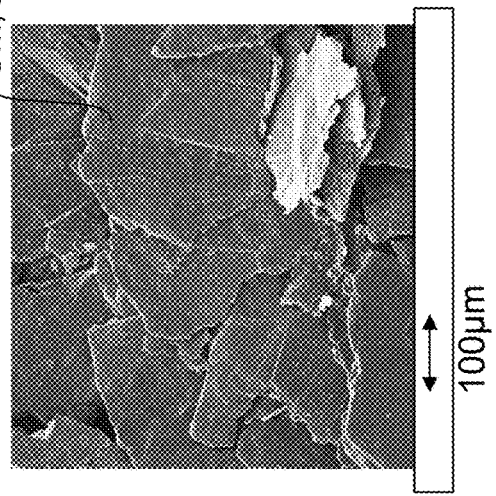
FIGS. 2A to 2E show the graphite material—in particular the graphite flakes used, during and after the processing inside a device according to the invention.
Figure 2A:
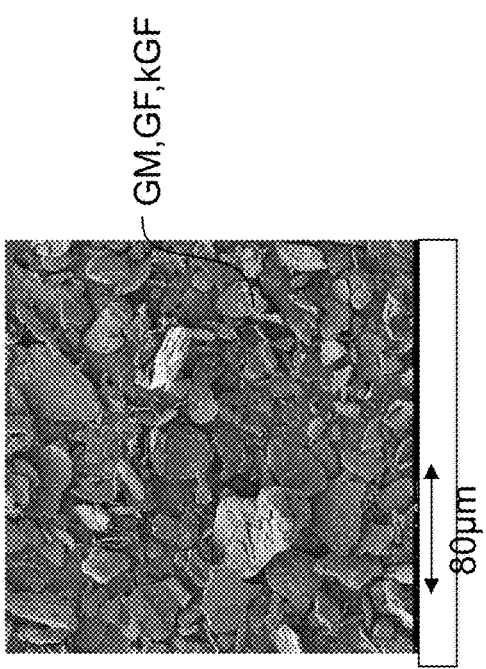
Figure 2E:
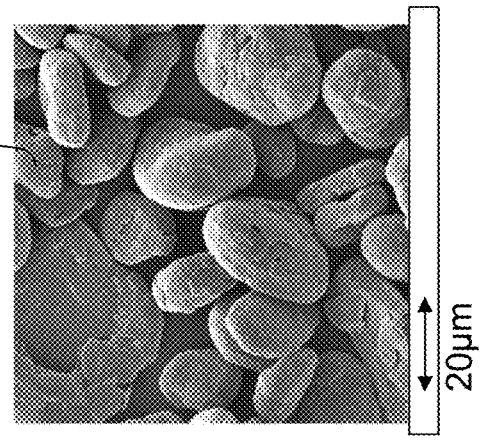
Figure 2D:
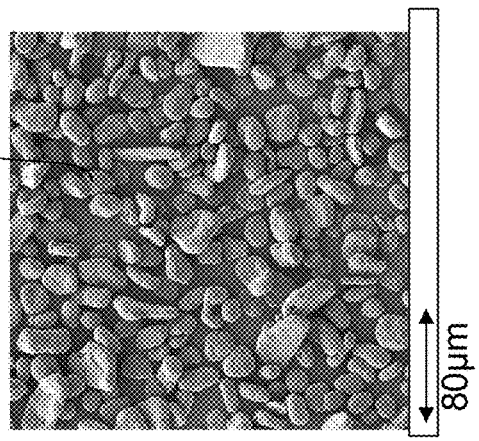
Figure 2C:
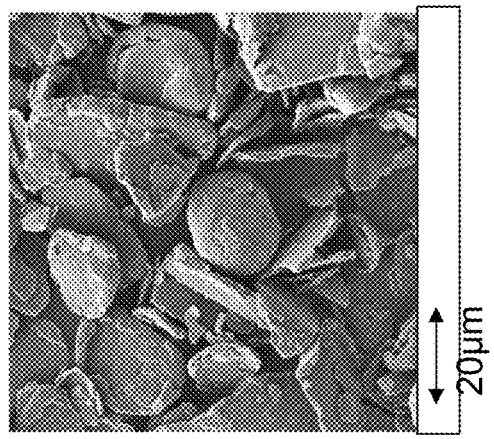

FIGS. 2A to 2E show graphite material GM—in particular graphite flakes GF used as the initial material during and after the processing inside a device 1 according to the invention. In particular, FIGS. 2A and 2B show different graphite flakes GF used as an initial material in different sizes. Graphite material GM according to FIG. 2A contains essentially small graphite flakes GF, whereas in FIG. 2B essentially large graphite flakes gGF are contained. FIG. 2C shows an intermediate stage in the rounding of graphite material GM, in which partial rounding by folding-over of large graphite flakes gGF and/or by agglomeration of small graphite flakes kGF has already taken place. FIGS. 2D and 2E show graphite material GM rounded inside the device according to the invention, which now essentially contains only rounded graphite particles vGT and which in particular has no fine material and/or superfine material.

FIGS. 3A to 3D and FIGS. 4A and 4B show different views of a further embodiment of a device 1 according to the invention for rounding graphite flakes GF of a graphite material GM. In particular, FIG. 3A shows a vertical cross-section through an upper region of device 1 with a closed suction unit 65, FIG. 3B shows a magnified representation of a partial area of FIG. 3A, FIG. 3C shows a horizontal cross-section through an upper region of device 1 and FIG. 3D shows a vertical cross-section through an upper region of device 1 with an opened suction unit 65.

Provided at the upper side of housing 2 of device 1 is a feeding device 3 in the form of a downpipe 4 for feeding graphite material GM containing for example graphite flakes GF. A rotating disc 7 is arranged in the interior of device 1. Rounding tools 5 are arranged and/or fastened in a regular arrangement on the upper side at the outer circumference of disc 7, adjacent to an inner lateral surface 21 or guide ring 41 of housing 2 of device 1. Disc 7 sits on a drive shaft 8 and is driven by the latter in rotation about a rotational axis D. Inner lateral surface 21 is constituted in particular as a rebound surface 6 adjacent to disc 7 and comprises structuring or profiling which assists the folding-together and/or agglomeration of graphite material GM.

Graphite material GM fed via downpipe 4 strikes rotating rounding tools 5 arranged on rotating disc 7, is accelerated and conveyed against rebound surface 6. Following this, graphite material GM is conveyed via the ascending air flow by guide element 25 to separator wheel 11.

Suction unit 65 preferably has a suction position AP directly at inner guide ring 15 of the guide apparatus. The removal of the product by means of suction unit 65 takes place in particular radially to inner guide ring 15. During the rounding of graphite material GM, suction unit 65 is closed by a mobile cylinder 66 extending radially towards inner guide ring 15. Cylinder 66 is in particular in a so-called closed position 66c (see FIG. 3A). In this case, only air L is sucked by suction unit 65 via auxiliary air nozzle 67. This thus prevents graphite material GM being extracted before it can strike rounding tools 5 and rebound surface 6. Suction unit 65 is not opened for the removal of rounded graphite material vGT via product outlet 17 until a displacement of mobile cylinder 66 takes place (see FIG. 3D). In particular, a product-air mixture comprising rounded graphite particles vGT and air L sucked in via auxiliary air nozzle 67 are extracted into suction unit 65 during and after the retraction of cylinder 66 into opening position 66o.

According to embodiment, provision can be made such that lateral face 50 of rounding tools 5, which points towards rotational axis D of disc 7, is in each case provided within a radius R. Rounded lateral face 50 forms a further rebound surface 51, which further assists the rounding of graphite material GM.

Provision can also be made such that all the lateral faces of rounding tools 5 standing up on disc 7 each have an identical height and that the upper side of rounding tools 5 is arranged in each case in a plane parallel to the plane of rotating disc 7.

Device 1 further comprises a separator wheel 11 as a separating device 10, via which the abrasion in the form of the fine material and/or superfine material FM arising during the rounding of graphite material GM are separated and removed from device 1 via suction nozzle 16. Separator wheel 11 is arranged above disc 7 with rounding tools 5. In the present example of the embodiment, separator wheel 11 is arranged on a coaxial shaft to drive shaft 8 of disc 7, so that separator wheel 11 and disc 7 can be moved in rotation independently of one another.

Process air PL is fed via feed nozzle 14 into the lower region of the device, which process air flows through, directed upwards, to the rounding region and guide elements 25 and is guided partially and primarily to separating device 10. The main flow of process air PL entrains fine material and/or superfine material FM and discharges the latter via suction nozzle 16 out of device 1.

Rounding tools 5 are placed for example on disc 7 and fixed on the latter by suitable fastening means 30, for example by means of a screw connection 31, a weld joint, an adhesive joint or suchlike. Alternatively, disc 7 can also be constituted in one piece with the rounding tools. Guide elements 25 are arranged above rounding tools 5, in such a way that they partially roof over rounding tools 5 from above. In particular, provision is made such that adjacent rounding tools 5 are in each case roofed over differently from above by guide elements 25. Some rounding tools 5*, in a regular arrangement, are also preferably not roofed over by guide elements 25. In particular, provision can be made such that the number of guide elements 25 is less than the number of rounding tools 5. Since guide elements 25 are arranged static inside the device, the relative arrangement of rounding tools 5 and guide elements 25 permanently changes in the ongoing operation.

In this embodiment, guide elements 25 are constituted in particular as essentially vertically arranged guide plates 26 which extend radially to rotational axis D and which can be kinked towards rotational direction DR in the lower region, so that an obtuse angle is formed between kinked region 27 and vertical guide plate 26 (see also FIGS. 4A and 4B). Kinked region 27 is in particular kinked towards rotational direction DR and brings about an optimized impact-free entry of graphite particles into the vertical part of guide apparatus 60 comprising guide elements 25. Kinked region 27 of guide element 25 in particular assists the specified diversion of swirling fine material and/or superfine material FM and also graphite material GM into a direction perpendicular to rotating disc 7. The fed graphite material inside the air flow is first conveyed past separator wheel 11, strikes disc 7 and is conveyed to rounding tools 5 and rebound surface 6.

Guide elements 25 can in particular be connected to one another at their side facing rotational axis D by a so-called air guide ring 15. Guide element 25 together with air guide ring 15 in particular form so-called guide apparatus 60. By means of the at least one guide apparatus 60, swirling graphite material GM after contact with rounding tools 5 and/or rebound surface 6 is diverted into a direction largely directed vertically upwards and fed for the most part without a swirling effect to separating device 10. This brings about an optimum incoming flow on separating device 10, as a result of which a high separation selectivity results. A part of process air PL can be separated out as a secondary flow and circulated inside the rounding region between rebound surface 6 and rounding tool 5. This secondary air has a supporting effect to ensure that graphite material GM comes into contact repeatedly and at different angles with rounding tools 5 and thus improves the folding-over and/or agglomeration of graphite material GM to form rounded graphite particles vGT.

In FIGS. 3A and 3B, furthermore, a cover ring 18 can be seen above rounding tools 5, which also serves to hold back graphite material GM in the rounding region and thus to increase the number of contacts between graphite material GM and the rebound surface and/or rounding tools 5. In particular, the circulation of graphite material GM inside device 1 is improved on account of an optimized flow control due to cover ring 18.

According to an embodiment, a distance A between adjacent rounding tools 5 amounts in each case to between 0.5 times a width B5 of rounding tools 5 and five times the width B5 of rounding tools 5. Width B5 of rounding tools 5 is determined orthogonal to radials r(D) proceeding from rotational axis D of disc 7. Distance A preferably amounts to less than three times the width B5 of rounding tools 5, particularly preferably less than 1.5 times the width B5 of rounding tools 5. In the represented example according to FIG. 3C, distance A amounts approximately to a width 5B of rounding tools 5.

The number of rounding tools 5 preferably amounts to between 15 and 35 rounding tools per m of the circumference of rotating disc 7 on which rounding tools 5 are arranged.

The removal of the end product, in particular of rounded graphite particles vGT, takes place via a product outlet 17, preferably after graphite material GM has been treated for a defined time inside device 1. A suction unit 65 is preferably assigned to product outlet 17. Suction unit 65 generates an underpressure, for example by retraction of a mobile cylinder 66 assigned to product outlet 17, and also opens product outlet 17 by retraction of mobile cylinder 66. Graphite material GM present inside device 1, which now preferably consists only of rounded graphite particles, together with air present inside device 1, is now extracted, wherein the extracted air with the graphite particles is first conveyed into a separating element (not represented), for example into a cyclone with a filter. The product comprising the rounded particles is separated from the air in the separating element.

According to an embodiment of the invention, the method does not involve a continuous process, in which graphite material GM is constantly fed and the end product in the form of rounded graphite particles vGT is permanently removed, but is rather a batch process, in which device 1 is filled with a defined quantity of graphite material GM and is operated for a defined time with a defined rotation value, before the end product is removed in the form of rounded graphite particles vGT.

In device 1, graphite material GM is preferably first conveyed to separator wheel 11 only after the rounding has taken place, whereas the abrasion in the form of fine material and/or superfine material FM can already be conveyed to separator wheel 11 during the rounding process and can be discharged from device 1 via a suction nozzle 16. The product removal takes place in particular via product outlet 17 only after the separator process, so that the removed end product essentially comprises only rounded graphite particles vGT and in particular no fine material and/or superfine material FM.

The number and shape of rounding tools 5 is adapted and optimized to the process. Rebound surface 6 is also optimized with regard to a mild strain on graphite material GM during the rounding and to avoiding fine material and/or superfine material FM.

FIGS. 4A and 4B show different views of a partial region of device 1 in a perspective representation. For an explanation of the individual components, reference is made in particular to the description in respect of FIG. 3B. FIGS. 4A and 4B essentially correspond to one another, wherein cover ring 18 above rounding tools 5 has been omitted in the representation of FIG. 4B, in order that rounding tools 5 can be seen better.

Figure 4D:
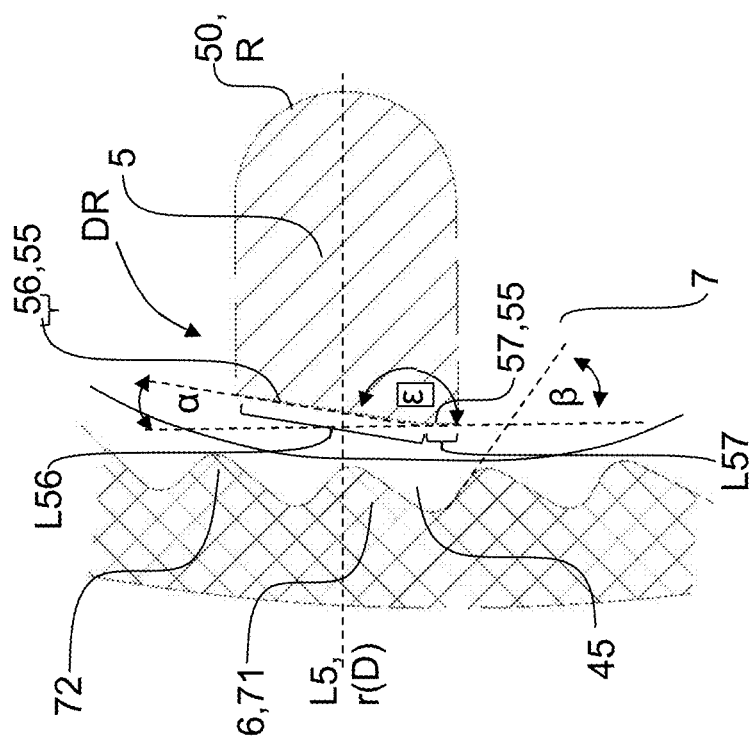
FIGS. 4C and 4D show different embodiments of the rebound surface.
Figure 4C:
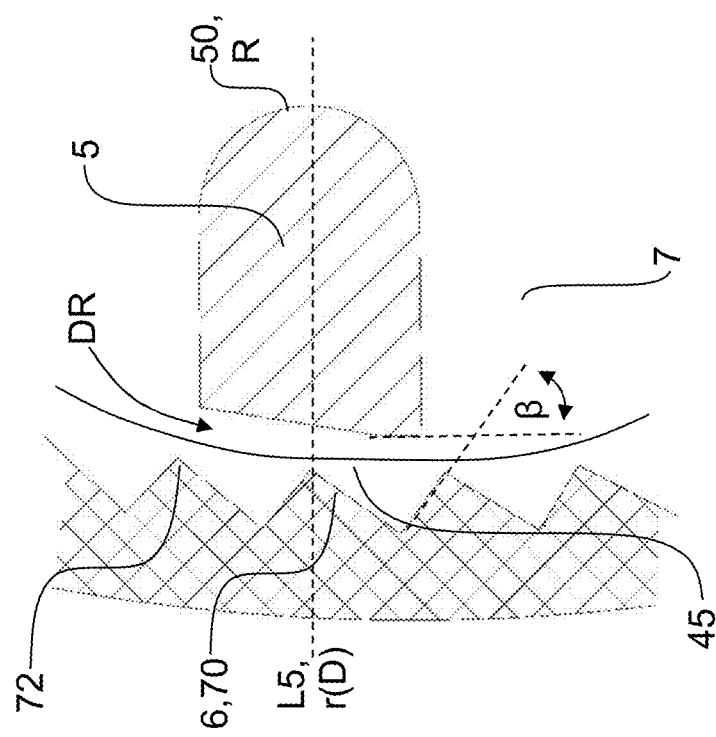

FIGS. 4C and 4D show different embodiments of rebound surface 6 and a rounding tool 5 arranged on rotating disc 7. Rounding tool 5 has a longitudinal axis L5, which coincides with a radial r(D) proceeding from the rotational axis of disc 7. Lateral face 50 of rounding tool 5 pointing towards the rotational axis of disc 7 has a radius R or is constituted as a rectangle. Lateral face 50 is preferably subdivided mirror-symmetrical by radial r(D).

The formation of lateral face 50 pointing towards the rotational axis of disc 7 as radius R or as a rectangle with a plurality of partial areas arranged at an angle to one another leads to a mild strain on graphite material GM. The latter is thus folded and in particular not crushed, since a central impact between the surface of rounding tools 5 and graphite material GM always occurs.

Lateral face 55 lying opposite lateral face 50 pointing towards the rotational axis of disc 7 is in particular also referred to as lateral face 55 facing away from the rotational axis. This lateral face 55 facing away from the rotational axis is preferably not subdivided mirror-symmetrical by radial r(D), since lateral face 55 consists of two partial areas 56 and 57 standing at an obtuse angle ε to one another. Partial area 57 leading in rotational direction DR is in particular arranged orthogonal or essentially orthogonal to radial r(D), whereas an acute angle α is formed between partial area 56 following on in rotational direction DR and an extension of leading partial area 56. It is preferably the case that the sum of acute angle α and obtuse angle ε results in 180 degrees.

Furthermore, provision is preferably made such that length L57 of partial area 57 leading in rotational direction DR is markedly smaller than length L56 of partial area 56 following on in rotational direction DR. In particular, length L57 amounts to between 5% and 30% of length L56, particularly preferably between 13% and 20%.

The effect of the previously described arrangement of partial areas 56, 57 of lateral face 55 is in particular that partial area 57 leading in rotational direction DR is arranged closer to rebound surface 6. Previously described angle α is also denoted as a clearance angle. The effect of this clearance angle α is in particular that gap 45 formed between rebound surface 6 and rounding tool 5 tapers in rotational direction DR, which additionally supports the gentle rounding of graphite material GM. In particular, an undesired thermal loading of graphite material GM by squeezing and/or friction is thus counteracted.

Furthermore, an angle β is formed between the profiling of rebound surface 6 and partial area 57 arranged closer to rebound surface 6, which angle amounts, depending on the variant of embodiment, to between 50 degrees and 90 degrees. Particularly preferably, angle β is always greater than 55 degrees and also always less than 90 degrees.

According to FIGS. 1, 3 and 4, the rebound surface is constituted in particular by the inner lateral surface of a cylindrical component. According to FIG. 4C, rebound surface 6 is constituted as a cylinder with a serrated inner lateral surface 70. As a result of this profiling of rebound surface 6, the surface which graphite material GM strikes is enlarged. In addition, the corners of the serrated inner lateral surface 70 represent further impact elements 72, which further assist the rounding of graphite material GM. According to FIG. 4D, rebound surface 6 is constituted as a cylinder with a corrugated inner lateral surface 71, as a result of which the surface which graphite material GM strikes is also enlarged. In the case of corrugated inner lateral surface 71, sharp corners on rebound surface 6 are in particular dispensed with, as a result of which graphite material GM is treated still more gently, so that the rounding can be further optimized.

With device 1 according to the invention and the method according to the invention, the yield of rounded graphite particles vGT related to the feeding quantity of graphite material GM is markedly increased compared to the devices and methods known from the prior art.

The device and the method are suitable in particular for the rounding of multi-layer materials, which permit folding and/or agglomeration of the material. In addition, the materials to be processed must have a certain flexibility, in order that they do not break during the rounding.

The embodiments, examples and variants of the preceding paragraphs, the claims or the following description and the figures, including their various views or respective individual features, can be used independently of one another or in any combination. Features which are described in connection with an embodiment can be applied to all the embodiments, insofar as the features are not incompatible.

When mention is also generally made of "schematic" representations and views in connection with the figures, this is under no circumstances intended to mean that the figure representations and their description are intended to have a subordinate significance with regard to the disclosure of the invention. The person skilled in the art is perfectly capable of deriving from the representations shown schematically and in abstract form sufficient information to facilitate his understanding of the invention, without his understanding possibly being impaired in any way by the size ratios, drawn and possibly not exactly true to scale, of parts of the device or other shown elements. The figures thus enable the person skilled in the art as a reader, on the basis of the more specifically explained implementations of the method according to the invention and the more specifically explained mode functioning of the device according to the invention, to derive a better understanding of the inventive ideas formulated more generally and/or in abstract form in the claims and in the general part of the description.

The invention has been described by reference to a preferred embodiment. It is however conceivable for the person skilled in the art that modifications or changes to the invention can be made, without thereby departing from the scope of protection of the following claims.

The invention claimed is:

1. A device for rounding a graphite material comprising:
   a feeding device for feeding the graphite material to the device;
   a rotating disc which includes a plurality of rounding tools arranged at an outer circumference of the rotating disc, wherein the rotating disc is rotatable about a rotational axis and in a rotational direction, wherein the rounding tools are designed to revolve while rotating to round the graphite material and minimize corners in the graphite material;
   at least one guide apparatus;
   a separating device that separates material of a first size and material of a second size from the rounded graphite material, the second size being smaller than the first size;
   a discharge outlet to remove the material of the first size and the material of the second size from the device; and
   a product outlet to remove the rounded graphite material from the device;
   wherein a cover ring is arranged above the rounding tools.

2. The device according to claim 1, wherein the cover ring extends over all the rounding tools arranged at the outer circumference of the disc.

3. The device according to claim 2, wherein the graphite material, after single or repeated active contact with at least one rounding tool, experiences a swirling effect, and wherein the graphite material is diverted into a largely vertical direction by means of the at least one guide apparatus and is fed largely without the swirling effect to the separating device.

4. The device according to claim 2, wherein the rounding tools each comprise a lateral face pointing in the direction of the rotational axis, wherein this lateral face is formed convex in the direction of the rotational axis or has a radius or wherein the lateral face pointing in the direction of the rotational axis is formed by a plurality of rectangles.

5. The device according to claim 1, wherein the graphite material, after single or repeated active contact with at least one rounding tool, experiences a swirling effect and wherein the graphite material is diverted into a largely vertical direction by means of the at least one guide apparatus and is fed largely without the swirling effect to the separating device.

6. The device according to claim 1, wherein the rounding tools each comprise a lateral face pointing in the direction of the rotational axis, wherein this lateral face is formed convex in the direction of the rotational axis or has a radius or wherein the lateral face pointing in the direction of the rotational axis is formed by a plurality of rectangles.

7. The device according to claim 1, wherein the guide apparatus comprises a plurality of guide elements and a guide ring, wherein the number of the guide elements is less than the number of the rounding tools.

8. The device according to claim 7, wherein the guide elements are designed as guide plates which are arranged on the guide ring, and wherein the guide ring is arranged statically above the rotating disc with the rounding tools, wherein the guide plates are each formed in a plane perpendicular to the rotating disc and to a tangent of the rotating disc above the rounding tools and wherein the guide plates are kinked in a lower region of a vertical plane towards the rotational direction.

9. The device according to claim 7, further comprising a suction device assigned to the product outlet for the product material, wherein a suction position of the suction device is constituted directly on an inner guide ring and wherein the suction device extends radially to the inner guide ring.

10. The device according to claim 9, wherein the suction device comprises a mobile cylinder or wherein a mobile cylinder is assigned to the suction device, wherein the mobile cylinder closes the product outlet in a first working position.

11. The device according to claim 1, wherein the device comprises at least one air supply device to provide an upwardly directed air flow, wherein by means of the air flow the graphite material is repeatedly advanced towards the rounding tools and wherein the air flow promotes the separation of the material of the first size and the material of the second size from the rounded graphite material.

12. The device according to claim 1, wherein the separating device is an air separator with a separator wheel, wherein the separator wheel is arranged coaxially above the rotating disc with the rounding tools.

13. The device according to claim 1, further comprising a control device, wherein the feeding of graphite material by the feeding device is controlled by means of the control device.

14. A method for rounding a graphite material, comprising:
using a device having:
a feeding device,
a rotating disc which includes a plurality of rounding tools arranged at an outer circumference of the rotating disc, wherein the rotating disc is rotatable about a rotational axis and in a rotational direction, wherein the rounding tools are designed to revolve while rotating to round the graphite material and minimize corners in the graphite material;
a separating device,
at least one guide apparatus for guiding the graphite material to the rounding tools and/or the separating device,
a discharge outlet,
a product outlet, and
a cover ring arranged above the rounding tools;
feeding the graphite material into the device via the feeding device;
providing a process air flow to convey the graphite material towards the rounding tools and the separating device;
rounding the graphite material by driving the rotating disc so that the graphite material comes into active contact with at least one rounding tool of the plurality of rounding tools;
separating material of a first size and material of a second size from the rounded graphite material, the second size being smaller than the first size;
removing the material of the first size and the material of the second size from the device via the discharge outlet; and
removing the rounded graphite material from the device via the product outlet;
wherein the cover ring limits a movement space for the process air flow conveying the graphite material and increases a number of contacts between the graphite material and the at least one rounding tool.

15. The method according to claim 14, wherein the rounded graphite material is conveyed swirl-free to the separating device.

16. The method according to claim 14, further comprising:
regulating the feeding of graphite material into the device via a control device, which controls a drive for driving of the rotating disc and a drive for driving the separating device, wherein the control device contains information concerning a switch-off value, wherein the feeding of further graphite material is ended when a defined switch-off value is reached, in particular wherein the switch-off value is calculated from a value of a current consumption of the drives.

17. The method according to claim 14, further comprising:
introducing air below the rotating disc and the separating device and directing the process air flow to convey the graphite material towards the rotating disc and the separating device, wherein the material of the first size and the material of the second size are entrained by the air and removed from the device via the discharge outlet.

18. The method according to claim 17, wherein the guide apparatus comprises a plurality of guide elements and a guide ring, the guide elements being designed to guide the air flow towards the separating device.

19. The method according to claim 18, wherein the active contact of the graphite material with the at least one rounding tool imparts a swirling effect on the graphite material, and wherein the guide elements divert the graphite material in a largely vertical direction without the swirling effect.

20. A device for rounding a graphite material comprising:
a feeding device for feeding the graphite material to the device;
a plurality of rounding tools designed to revolve while rotating, the rounding tools being arranged at an outer circumference of a rotating disc rotating about a rotational axis and in a rotational direction;
at least one guide apparatus;
a separating device for separating material of a first size and material of a second smaller size;
a product outlet;
wherein a cover ring is arranged above the rounding tools
wherein the guide apparatus comprises a plurality of guide elements and a guide ring, wherein the number of the guide elements is less than the number of the rounding tools.

* * * * *